US012712778B2

(12) United States Patent
Bachu et al.

(10) Patent No.: US 12,712,778 B2
(45) Date of Patent: Aug. 18, 2026

(54) TAG-BASED NETWORK-WIDE TROUBLESHOOTING

(71) Applicant: Arista Networks, Inc., Santa Clara, CA (US)

(72) Inventors: Rikith Reddy Bachu, Hyderabad (IN); Karan Gupta, Pune (IN)

(73) Assignee: Arista Networks, Inc., Santa Clara, CA (US)

( * ) Notice: Subject to any disclaimer, the term of this patent is extended or adjusted under 35 U.S.C. 154(b) by 91 days.

(21) Appl. No.: 18/622,347

(22) Filed: Mar. 29, 2024

(65) Prior Publication Data

US 2025/0310177 A1 Oct. 2, 2025

(51) Int. Cl.
*H04L 41/0631* (2022.01)
*H04L 43/10* (2022.01)

(52) U.S. Cl.
CPC .......... *H04L 41/0631* (2013.01); *H04L 43/10* (2013.01)

(58) Field of Classification Search
CPC ............................ H04L 41/0631; H04L 43/10
See application file for complete search history.

(56) References Cited

U.S. PATENT DOCUMENTS

| | | | | |
|---|---|---|---|---|
| 11,399,054 | B2 | 7/2022 | Gupta et al. | |
| 11,722,358 | B1 | 8/2023 | Gupta et al. | |
| 2021/0092034 | A1 | 3/2021 | Reddy et al. | |
| 2021/0168657 | A1* | 6/2021 | Potharaju | H04W 28/0231 |
| 2021/0203673 | A1* | 7/2021 | dos Santos | H04L 63/1408 |
| 2025/0293921 | A1* | 9/2025 | Nimmagadda | H04L 41/064 |

OTHER PUBLICATIONS

Bachu et al., U.S. Appl. No. 18/078,434, filed Dec. 9, 2022.

* cited by examiner

*Primary Examiner* — Kamal M Hossain
(74) *Attorney, Agent, or Firm* — Treyz Law Group, P.C.; Tianyi He

(57) ABSTRACT

A network troubleshooting system may include one or more tagging modules configured to associate tags with various network entities. The tags may identify issues experienced or exhibited by the tagged network entity and/or may provide contextual information for the tagged network entity. The network troubleshooting system may include a tag analyzer that correlates the various tags and the associated network entities to identify causes or generally facilitate the mitigation of the issues.

20 Claims, 9 Drawing Sheets

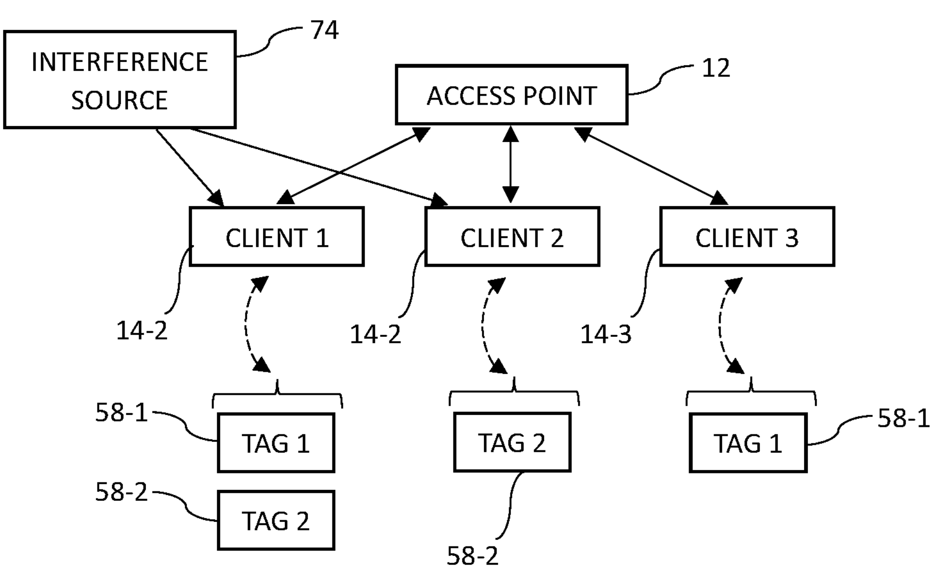
FIG. 5

| TIME | CLIENT | LOCATION | POOR APPLICATION EXPERIENCE TAG | HIGH INTERFERENCE TAG |
|---|---|---|---|---|
| T0 | 14-1 | F | True | True |
| T0 | 14-2 | F | False | True |
| T0 | 14-3 | F | True | False |

| TIME | CLIENT | LOCATION | POOR APPLICATION EXPERIENCE TAG | HIGH INTERFERENCE TAG | PERIODIC HIGH INTERFERENCE TAG |
|---|---|---|---|---|---|
| T0 | 14-1 | F | True | True | False |
| T1 | 14-1 | F | True | True | False |
| T2 | 14-1 | F | True | True | False |
| T3 | 14-1 | F | True | True | True |

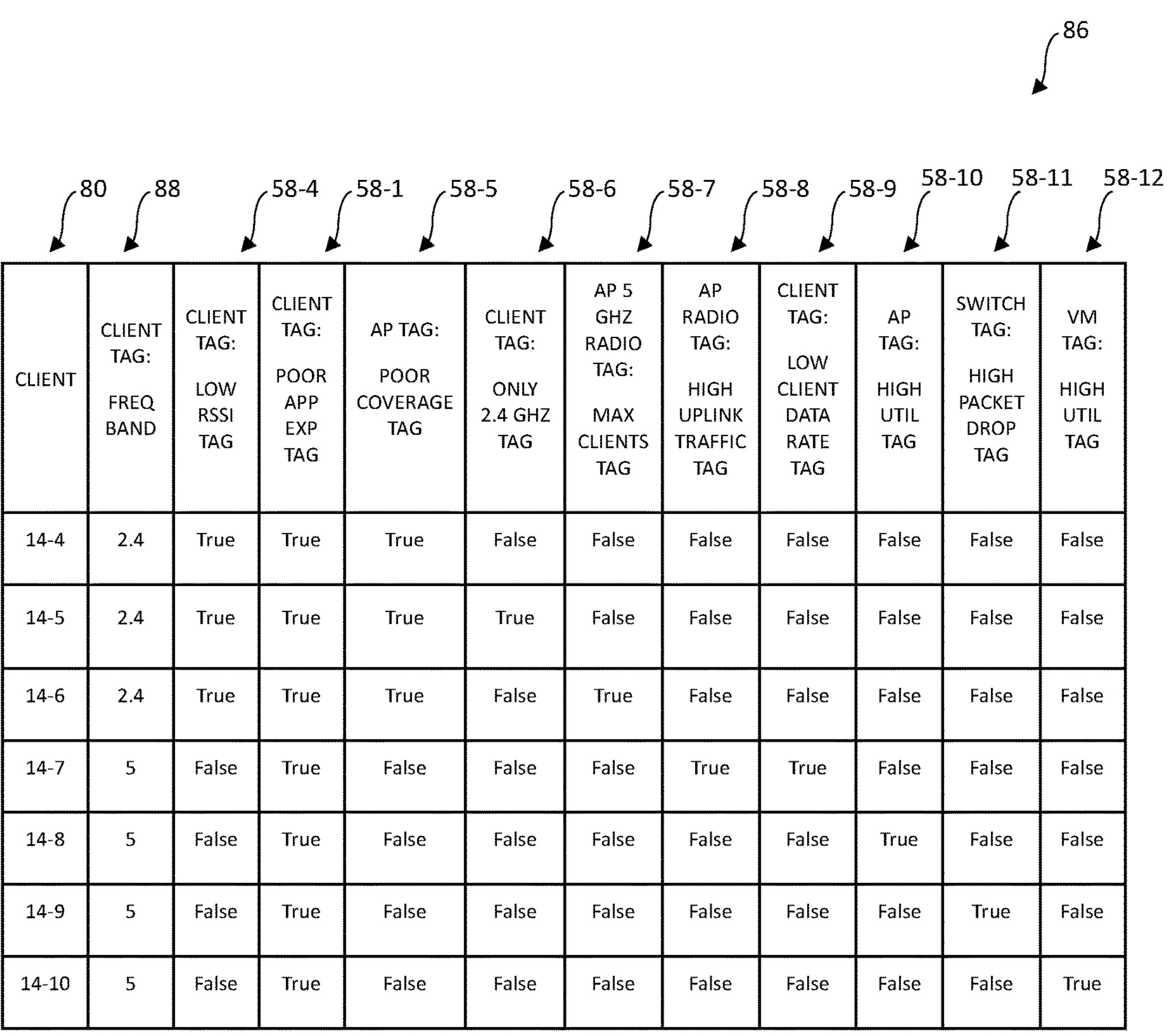

| CLIENT | CLIENT TAG: FREQ BAND | CLIENT TAG: LOW RSSI TAG | CLIENT TAG: POOR APP EXP TAG | AP TAG: POOR COVERAGE TAG | CLIENT TAG: ONLY 2.4 GHZ TAG | AP 5 GHZ RADIO TAG: MAX CLIENTS TAG | AP RADIO TAG: HIGH UPLINK TRAFFIC TAG | CLIENT TAG: LOW CLIENT DATA RATE TAG | AP TAG: HIGH UTIL TAG | SWITCH TAG: HIGH PACKET DROP TAG | VM TAG: HIGH UTIL TAG |
|---|---|---|---|---|---|---|---|---|---|---|---|
| 14-4 | 2.4 | True | True | True | False | False | False | False | False | False | False |
| 14-5 | 2.4 | True | True | True | True | False | False | False | False | False | False |
| 14-6 | 2.4 | True | True | True | False | True | False | False | False | False | False |
| 14-7 | 5 | False | True | False | False | False | True | True | False | False | False |
| 14-8 | 5 | False | True | False | False | False | False | False | True | False | False |
| 14-9 | 5 | False | True | False | False | False | False | False | False | True | False |
| 14-10 | 5 | False | True | False | False | False | False | False | False | False | True |

FIG. 8

TAG-BASED NETWORK-WIDE TROUBLESHOOTING

BACKGROUND

A communication system includes multiple network devices that are interconnected to form a network for conveying network traffic for hosts. Numerous types of network-related issues can lead to degradation of network performance. It may be desirable to pinpoint a root cause of issues to facilitate issue-specific mitigation.

BRIEF DESCRIPTION OF THE DRAWINGS

FIG. 5 is a diagram of illustrative client devices coupled to a wireless access point of a network in accordance with some embodiments.

FIG. 8 is a diagram of illustrative sets of one or more tags indicative of various types of issues and corresponding causes in accordance with some embodiments.

DETAILED DESCRIPTION

Figure 1:
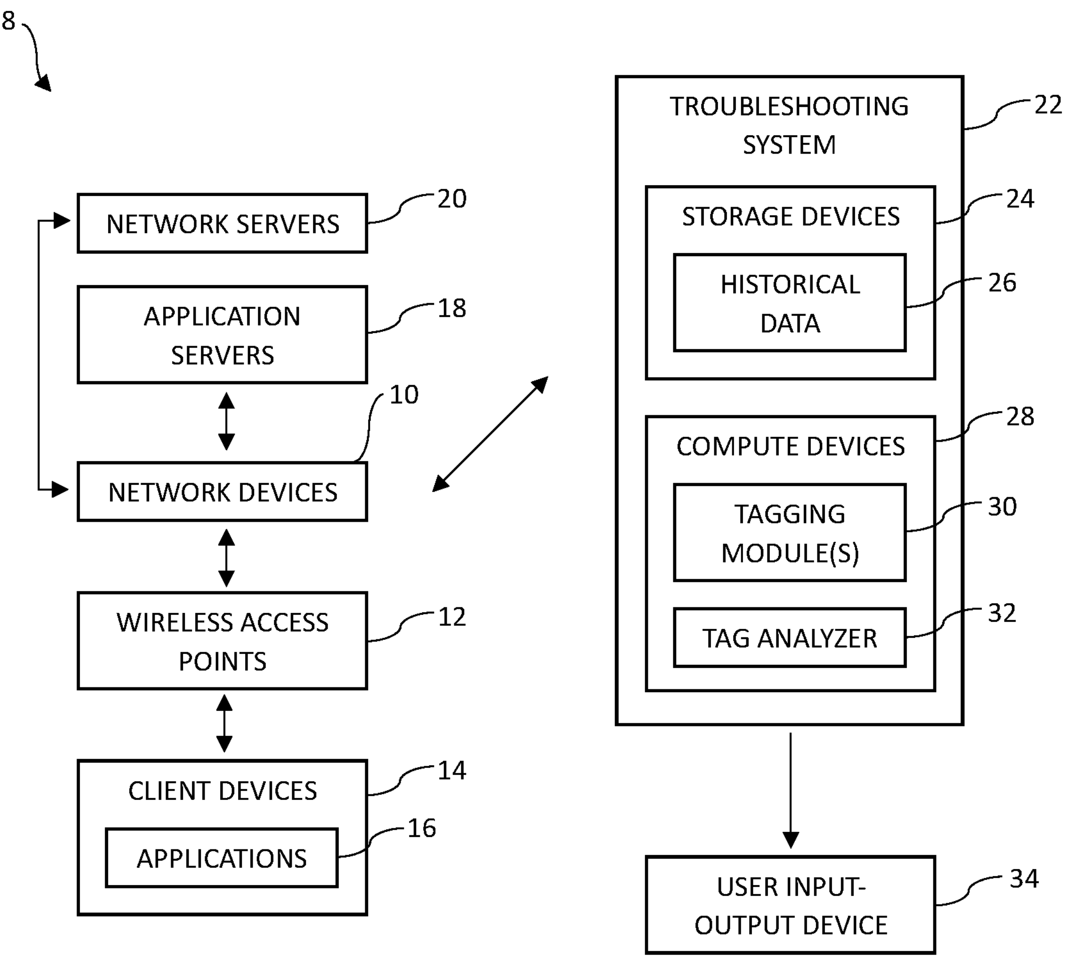
FIG. 1 is a diagram of an illustrative networking system that includes a troubleshooting system for a network in accordance with some embodiments.

A network can convey network traffic, e.g., in the form of frames, packets, etc., between hosts or generally between devices in the network. In some illustrative configurations described sometimes herein as an illustrative example, these hosts may include client devices coupled to wireless access points in the network and, through the wireless access points, may be connected to other network devices that form a wired portion of the network.

To identify causes of network issues and assist a user (e.g., a network administrator) in resolving these issues, a troubleshooting system may be communicatively coupled to the network components and/or network management equipment (e.g., that manage the operation of network devices, that manage the operation of network servers, that manage the operation of application servers, etc.). Storage device(s) of the troubleshooting system may obtain and store telemetry data based on the operation of the network and/or based on the configuration of the network. The telemetry data may include current telemetry data and/or past telemetry data stored as historical telemetry data. Compute device(s) of the troubleshooting system may implement one or more tagging module(s) that associate one or more tags with one or more corresponding network entities (based on current and/or historical telemetry data) and may implement a tag analyzer that processes the tags and/or other information to identify causes of network issues and provide recommendations for the identified causes to resolve the network issues. The issues, the identified cause(s) of the issues, and the recommendation may be conveyed in the form of one or more notifications for output to a user via a user interface on a user computing device.

The tags described herein may identify issues or other information that can be associated with network entities in any part of the network hierarchy (e.g., a network-wide entity, a device entity, a server entity, a device component entity, a client device entity, an application entity, etc.). Accordingly, information for and/or issues identified by tags at any combination of these entities can be correlated to determine root causes for a wide variety of network issues occurring at any part of the network hierarchy. This general approach of tag-based troubleshooting may also be easily expandable and scalable as the tagging modules can be configured to generate additional types of tags and/or the tag analyzer can be configured to identify additional types of correlations as the network changes and as new insights into the network are gained.

Configurations in which the tagging modules and tag analyzer use tags for identifying causes of client application issues are sometimes described herein as illustrative examples. In general, the tagging modules and tag analyzer may similarly use tags to facilitate the identification of causes of network inefficiencies, network performance issues, and/or generally any issues encountered within or adjacent to the network.

An illustrative networking system that includes a troubleshooting system is shown in FIG. 1. In the example of FIG. 1, the networking system may include one or more components of a network such as network 8. Network 8 may have any suitable scope. As examples, network 8 may include, be, and/or form part of one or more local segments, one or more local subnets, one or more local area networks (LANs), one or more campus area networks, a wide area network, etc. Network 8 may include a wired network (portion) based on wired technologies or standards such as Ethernet (e.g., using copper cables and/or fiber optic cables) and a wireless network (portion) such as one or more wireless local area networks (WLANs) (e.g., Wi-Fi networks compliant with the IEEE 802.11 family of standards). If desired, network 8 may also include internet service provider networks (e.g., the Internet) or other public service provider networks, private service provider networks (e.g., multiprotocol label switching (MPLS) networks), and/or other types of networks such as telecommunication service provider networks.

Network 8 may be implemented using one or more network devices that handle (e.g., process by modifying, forwarding, etc.) network traffic to convey information for user applications between end hosts and/or generally for other applications between devices. Network 8 can include networking equipment forming a variety of network devices such network devices 10 that interconnect end hosts of network 8 (e.g., client devices 14, (user) application servers 18, network (resource) servers 20, etc.). Network devices 10 of network 8 may include one or more wireless access points such as wireless access points 12, one or more switches (e.g., multi-layer (Layer 2 and Layer 3) switches, single-layer (Layer 2) switches, etc.), one or more bridges, one or more routers or gateways, one or more hubs, one or more repeaters, one or more firewalls, one or more devices serving other networking functions, one or more devices that include the functionality of two or more of these devices, and/or management equipment that manage and control the operation of one or more of these network devices.

End hosts of network 8 can include computers (e.g., serving as client devices 14), servers (e.g., user application servers 18, network servers 20, etc.), portable electronic devices (e.g., serving as client devices 14) such as cellular telephones and laptops, other types of specialized or general-purpose host computing equipment (e.g., running one or more client-side applications 16 and/or server-side applications), network-connected appliances or devices (e.g., serving as client devices 14) such as cameras, thermostats, wireless sensors, medical, health, or other sensors, lighting fixtures, speakers, printers, controllers, and other network-connected equipment in a distributed networking system, computing devices used by users or network administrators such as user input-output device 34 (e.g., serving as a client device 14), network service devices, and/or management equipment that manage and control the operation of one or more other end hosts and/or network devices.

Wireless access points 12 may implement a wireless network (portion) through which wireless end hosts are communicatively (e.g., wirelessly) coupled to a wired network. In these wireless network configurations, the end hosts connected to network 8 via wireless access points 12 are often referred to as client devices or stations 14, or simply, clients 14.

In the example of FIG. 1, each client device 14 may transmit and receive network traffic to support the execution of one or more client-side (software) applications 16 executed thereon. As examples, applications 16 may include video conferencing applications, Voice over Internet Protocol application, streaming media applications, web browsing applications, gaming applications, and/or other applications for which network traffic satisfying a corresponding quality of service is desired or required. In particular, access points 12 and other network devices 10 may convey the network traffic (sometimes referred to herein as application traffic in this context) between different client devices 14 and/or between client devices 14 and application servers 18 that host server-side applications providing application data for corresponding client-side applications 16.

To support network connectivity and provide network resources and/or services (e.g., for the execution and operation of applications 16), network 8 may include network servers 20. Network servers 20 may include network address assignment server(s) such as Dynamic Host Configuration Protocol (DHCP) servers that provide network address (e.g., Internet Protocol (IP) address) assignment services, may include Domain Name System (DNS) servers that provide translations services from domain names to IP addresses, may include Authentication, Authorization, and/or Accounting (AAA) server(s) that provide client authentication, authorization, and/or accounting services, and/or may include other types of network servers that store and manage (shared) network resources and provide other network services for hosts (e.g., client devices 14). Client devices 14 may be communicatively coupled to and access network servers 20 (e.g., the resources and/or services provided thereon) via network devices 10 to support the operation of applications 16 (e.g., by using a DHCP server to obtain a client IP address based on which application 16 operates, by obtaining an IP address of application server 18 using a DNS server, by authentication a host or client using an authentication server, etc.).

From time to time, one or more network components (e.g., network devices 10, client devices 14, application servers 18, network servers 20, etc.) may experience issues that adversely impact the performance of user applications 16 or generally operations within network 8. To identify causes of network issues and assist a user (e.g., a network administrator) in resolving these issues, a troubleshooting system such as troubleshooting system 22 may be communicatively coupled to network 8 (e.g., the components therein). As examples, troubleshooting system 22 may establish communication links (e.g., sessions, channels, paths, etc.) for communicating with the network components themselves (e.g., network devices 10), with network management equipment that manage the operations of network devices 10 (e.g., network controllers), with network management equipment that manage the operations of network servers 20, with server (virtual machine) management equipment that manage the operations of application servers 18, and/or generally with other sources of telemetry information gathered from network 8.

Through these communication links, troubleshooting system 22 may obtain telemetry data that is indicative of network issues experienced in network 8. Troubleshooting system 22 may obtain and process current telemetry data in real-time and/or may obtain and store current telemetry data as historical telemetry data (for later processing). In particular, troubleshooting system 22 may include one or more storage devices 24 configured to store telemetry data as historical telemetry data 26, current telemetry data, and/or processed telemetry data.

To process the (current and/or historical) telemetry data and generally perform troubleshooting functions, troubleshooting system 22 may include one or more compute devices 28. Compute device(s) 28 may provide (e.g., execute, implement, etc.) one or more tagging modules 30 (sometimes referred to herein as tagging processes when executed as software instructions on compute devices 28) and a corresponding tag analyzer 32 (sometimes referred to herein as a tag analysis process when executed as software instructions on compute devices 28). Tagging modules 30 may provide tag information representing corresponding issues and/or other information identified based on telemetry data. Tag analyzer 32 may identify causes of issues (e.g., one or more root causes of a set of issues, a particular issue that is a root cause of a remainder of the issues, etc.) based on the tag information and may provide recommendations for eliminating the causes, and therefore, resolving the network issues.

While illustrative operations such as obtaining telemetry data, providing tag information such as tags, associating (tagging) corresponding network entities with tags, identifying causes of issues based on the tag information, providing recommendations for remediation, and notifying users or network management (server) systems are sometimes described herein to be operations performed by tagging modules 30 and tag analyzer 32, this is merely illustrative. In general, troubleshooting system 22 (e.g., compute devices 28 and/or storage devices 24) may be organized in any suitable manner to perform these operations. As examples, different software processes or processing circuitry (executing the processes) may perform some of these operations and/or the same software process or processing circuitry (executing the process) may perform some of these operations. As described herein, tagging modules 30 and tag analyzer 32 may generally refer to the portions of a troubleshooting system (e.g., one or more of compute devices 28 and storage devices 24, one or more software processes executing on device(s) 28, other hardware components in system 22, other non-server devices in system 22, etc.)

configured to perform at least some of the above-mentioned operations, regardless of how the portions are organized.

In illustrative configurations described herein as an example, troubleshooting system 22 may also be communicatively coupled to a user device 34 (sometimes referred to herein as an administrator device). Troubleshooting system 22 may provide tag information, issues (represented by the tag information), causes of the issues (e.g., root causes of the issues), recommendations, and/or any other suitable information generated or otherwise obtained by troubleshooting system 22 to user device 34. As one illustrative example, at least some of this information may be conveyed to user device 34 in the form of one or more notifications presented to the user via a user interface at device 34. User device 34 may be one of the client devices 14 coupled to network 8 (e.g., may be a portable electric device such as a laptop or cellular telephone or may be any suitable computing equipment having an output device configured to provide user output containing the notification(s)). As another illustrative example, troubleshooting system 22, may provide the tag information, issues, causes of the issues, recommendations, and/or other information generated or otherwise obtained by system 22 to a network management device (e.g., a network management server that manages the operations of network devices 10 and/or other components of network 8). The network management device may be accessible by user device 34 and/or may subsequently provide user device 34 with the notification(s) containing one or more of the pieces of information provided by troubleshooting system 22.

In one illustrative configuration described herein as an example, troubleshooting system 22 may be implemented on server equipment and may sometimes be referred to herein as (network) troubleshooting server 22 in these configurations. The server equipment may include server hardware such as one or more blade servers, one or more rack servers, and/or one or more tower servers. Compute devices 28 and storage devices 24 for implementing the functions of troubleshooting server 22 may be provided as part of the server hardware.

As examples, each compute device 28 may include one or more processors such as central processing units (CPUs), graphics processing units (GPUs), microprocessors, general-purpose processors, host processors, microcontrollers, digital signal processors, programmable logic devices such as field programmable gate array (FPGA) devices, application specific system processors (ASSPs), application specific integrated circuit (ASIC) processors, and/or other types of processors (e.g., of other processor architecture types). Compute device(s) 28 may sometimes be referred to herein as the processing circuitry of the troubleshooting server. Each storage device 24 may include non-volatile memory (e.g., flash memory, electrically-programmable read-only memory, a solid-state drive, hard disk drive storage, etc.), volatile memory (e.g., static or dynamic random-access memory), removable storage devices (e.g., storage devices removably coupled to the server hardware implementing the troubleshooting server), and/or other types of memory circuitry. Compute device(s) 28 may sometimes be referred to herein as the memory circuitry of the troubleshooting server.

When implemented as described above, the memory circuitry formed from storage device(s) 24 may include one or more non-transitory (tangible) computer-readable storage media that store the operating system software and/or any other software code, sometimes referred to as program instructions, software, data, instructions, or code. The processing circuitry formed from compute device(s) 28 may run (e.g., execute) operating system software and/or other software and firmware stored on the one or more non-transitory computer-readable storage media to perform the operations of troubleshooting system 22. As just a few examples, based on the processing circuitry executing instructions stored on the memory circuitry, troubleshooting system 22 may implement telemetry data streaming process(es) and/or other process(es) for obtaining telemetry data, one or more processes such as tagging processes (e.g., corresponding to tagging modules 30), a tag analysis process (e.g., corresponding to tag analyzer 32), tag analysis output process(es) that provide interface(s) by which notifications or other information are output to an output device (e.g., user device 34). In other illustrative arrangements, the components of troubleshooting system 22 may be implemented on one or more dedicated local troubleshooting devices or generally implemented using non-server hardware (e.g., as part of other types of hardware systems).

Figure 2:
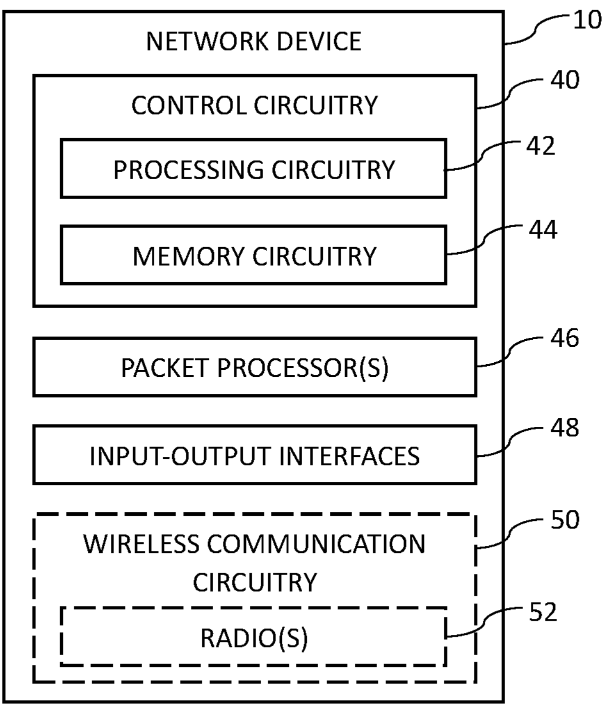
FIG. 2 is a diagram of an illustrative network device in accordance with some embodiments.

FIG. 2 is a diagram of an illustrative network device such as one or more wireless access points 12 in FIG. 1 and/or other types of network devices 10 in FIG. 1. As shown in FIG. 2, network device 10 may include control circuitry 40 having processing circuitry 42 and memory circuitry 44, one or more packet processors 46, and input-output interfaces 48. In configurations in which network device 10 (FIG. 2) implements a wireless access point, network device 10 in FIG. 2 (e.g., wireless access point 12) may include wireless communication circuitry 50. In other configurations such as when network device 10 in FIG. 2 implements a switch, a router, a gateway, or another type of network device, network device 10 (FIG. 2) may omit wireless communication circuitry 50. In general, different types of network devices in network 8 may have some of the same components as and some components different from the components of network device 10 as shown in FIG. 2.

Processing circuitry 42 may include one or more processors such as central processing units (CPUs), graphics processing units (GPUs), microprocessors, general-purpose processors, host processors, microcontrollers, digital signal processors, programmable logic devices such as field programmable gate array (FPGA) devices, application specific system processors (ASSPs), application specific integrated circuit (ASIC) processors, and/or other types of processors (e.g., of other processor architecture types).

Processing circuitry 42 may run (e.g., execute) a network device operating system and/or other software/firmware that is stored on memory circuitry 44. Memory circuitry 44 may include one or more non-transitory (tangible) computer-readable storage media that store the operating system software and/or any other software code, sometimes referred to as program instructions, software, data, instructions, or code. In particular, memory circuitry 44 may include non-volatile memory (e.g., flash memory, electrically-programmable read-only memory, a solid-state drive, hard disk drive storage, etc.), volatile memory (e.g., static or dynamic random-access memory), removable storage devices (e.g., storage devices removably coupled to device 10), and/or other types of memory circuitry.

Processing circuitry 42 and memory circuitry 44 as described above may sometimes be referred to collectively as control circuitry 40 (e.g., implementing a control plane of network device 10). As just a few examples, processing circuitry 42 may execute network device control plane software such as operating system software, routing policy management software, routing protocol agents or processes, routing information base agents, and other control software, may be used to support the operation of protocol clients and/or servers (e.g., to form some or all of a communications protocol stack), may be used to support the operation of packet processor(s) 46, may store packet forwarding information, may execute packet processing software, and/or may execute other software instructions that control the functions of network device 10 and the other components therein.

Packet processor(s) 46 may be used to implement a data plane or forwarding plane of network device 10 and may therefore sometimes be referred to herein as data plane processor(s) or data plane processing circuitry. Packet processor(s) 46 may include one or more processors such as programmable logic devices (e.g., field programmable gate array (FPGA) devices), application specific system processors (ASSPs), application specific integrated circuit (ASIC) processors, central processing units (CPUs), graphics processing units (GPUs), microprocessors, general-purpose processors, host processors, microcontrollers, digital signal processors, and/or other types of processors (e.g., of other processor architecture types).

A packet processor 46 may receive incoming (ingress) network traffic via input-output interfaces 48, parse and analyze the received network traffic, process the network traffic based on packet forwarding decision data (e.g., in a forwarding information base) and/or in accordance with network protocol(s) or other forwarding policy, and forward (or drop) the network traffic accordingly (e.g., egress the processed network traffic via input-output interfaces 48). The packet forwarding decision data may be stored on memory circuitry integrated as part of and/or separate from packet processor 46 (e.g., on content-addressable memory), and/or on a portion of memory circuitry 44. Memory circuitry for packet processor 46 may include volatile memory, non-volatile memory, and/or other types of memory circuitry.

Input-output interfaces 48 (sometimes referred to herein as network interfaces) may include one or more different types of communication interfaces such as Ethernet interfaces, optical interfaces, and/or other types of communication interfaces for connecting network device 10 to the Internet, a local area network, a wide area network, a mobile network, and/or generally other network device(s) in network 8, peripheral devices, and computing equipment (e.g., host equipment such as server equipment, client devices, etc.).

In illustrative configurations described herein as an example, input-output interfaces 48 may include Ethernet interfaces implemented using and therefore including (Ethernet) ports. In particular, physical layer and/or data link layer interface circuitry in network device 10 may be coupled to the ports and use the ports to form Ethernet interfaces with the desired interface configurations. The ports may be physically coupled and electrically connected to corresponding mating connectors of external equipment, when received at the ports, and may have different form-factors to accommodate different cables, different modules, different devices, or generally different external equipment.

Network device 10 (e.g., when implementing wireless access point 12) may include wireless communication circuitry 50 configured to communicate wirelessly with client devices 14 (FIG. 1) and generally provide wireless communication capabilities. Wireless communication circuitry 50 may include one or more radios 52 (e.g., Wi-Fi radios), radio-frequency transceiver circuitry, radio-frequency front-end circuitry, and one or more antennas. Wireless communication circuitry 50 may include components (e.g., one or more radios 52, transceiver circuitry, front-end circuitry, and one or more antennas) configured to operate in a 2.4 GHz radio-frequency band, a 5 GHz radio-frequency band, a 6 GHz radio-frequency band, and/or other radio-frequency bands. If desired, these components may operate in multiple such radio-frequency bands (e.g., transmit and/or receive signals in multiple radio-frequency bands) simultaneously. Radio(s) 52 may use the one or more antennas to transmit radio-frequency signals to and receive radio-frequency signals from one or more client devices 14. While wireless communication circuitry 50 is shown as a separate element from processing circuitry 42, this is merely illustrative. If desired, portions of wireless communication circuitry 50 (e.g., radio functionalities) may be implemented as a portion of processing circuitry 42.

If desired, network device 10 may include other components such as output devices that provide user output such as a display device (e.g., one or more status lights) and/or input devices that gather user input such as one or more buttons. If desired, these other components may include one or more sensors such as radio-frequency sensors. If desired, these other components may include a system bus and/or other communication paths that couple the internal components of network device 10 to one another, to power management components, etc. In general, each component of network device 10 may be coupled to control circuitry 40 (e.g., processing circuitry 42 and/or memory circuitry 44) via one or more paths that enable the reception and transmission of control signals, data, and/or other information therebetween.

With the tag-based troubleshooting system 22 in FIG. 1, different types of issues experienced by network entities at various levels of the network hierarchy (e.g., at a system level, at a device level, at a device component level, at an application level, etc.) can be captured using tags. These tags may also capture time-sensitive issues (e.g., be time-dependent tags). Accordingly, based on analysis of these tags, correlations between issues at different entities physically across the network, correlations between issues at different entities at the various levels of the network hierarchy, correlations between issues at the same or different entities across time, and/or correlations between issues generally represented by tags can be identified to diagnose a wide variety of issues and determine corresponding causes using this tag-based scheme.

Figure 3:
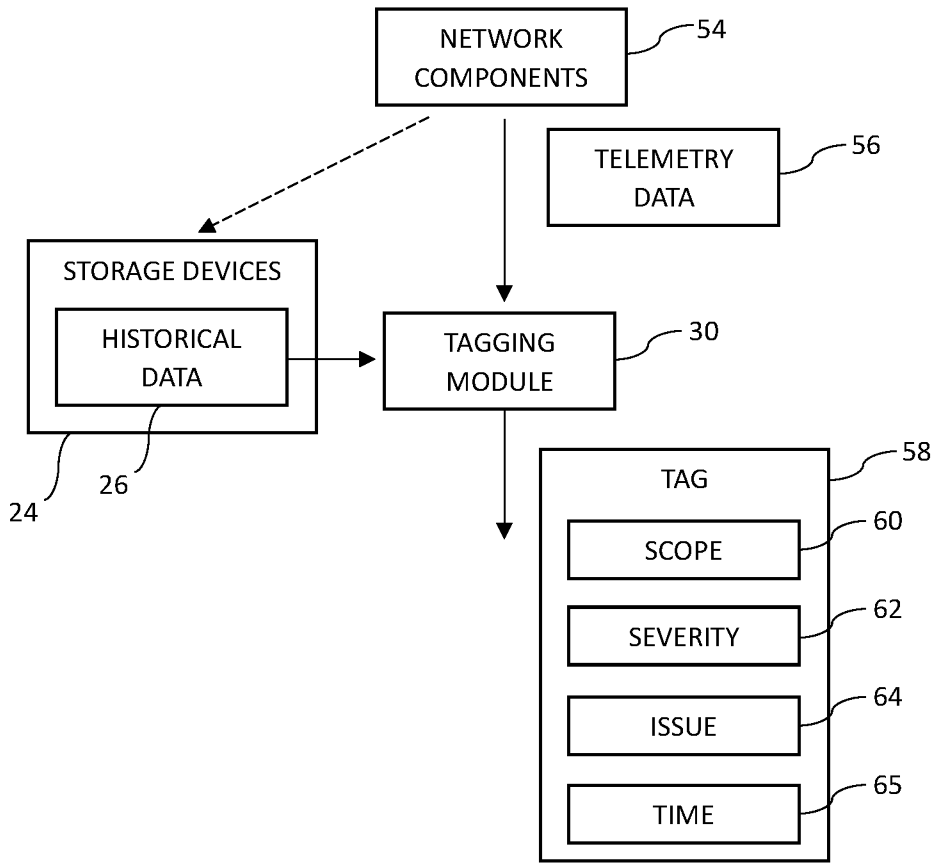
FIG. 3 is a diagram of an illustrative tagging module configured to generate tag information for network entities based on telemetry data in accordance with some embodiments.

FIG. 3 is a diagram of an illustrative tagging module 30 in troubleshooting system 22 (FIG. 1). Tagging module 30 (e.g., processing circuitry on server equipment) may be configured to generate one or more tags for various network entities based on receiving telemetry data describing the operation of the various network entities and/or other type of network performance or configuration information. If desired, one or more network components 54 may gather or otherwise obtain telemetry data 56 and provide (e.g., transmit) telemetry data 56 to tagging module 30.

As examples, network components 54 may generally serve as telemetry data sources and may include network devices 10, management equipment such as a network controller for managing the configuration or generally the operation of network devices 10, wireless access points 12, wireless network management equipment for managing the configuration and/or operation of wireless access points 12, application servers 18, host management equipment such as virtual machine management equipment for managing application servers 18 (e.g., for managing the compute, storage, network interfaces, and/or other resources of servers 18), network servers 20, management equipment for managing the resources stored on and services provided by network servers 20, and/or other components of network 8.

In some illustrative configurations, tagging module 30 may be configured to generate one or more tags 58 based on real-time telemetry data 56 by tagging module 30. In other illustrative configurations (e.g., where tags 58 identify time-dependent issues), tagging module 30 may use historical telemetry data 26 in addition to or instead of real-time telemetry data obtained from network component(s) 54. Tagging module 30 may obtain historical telemetry data 26 from storage device(s) 24 (e.g., memory circuitry on server equipment). If desired, (real-time) telemetry data 56 may be provided to storage devices 24 for storage prior to being processed by tagging module 30. If desired, telemetry data 56 may be aggregated by a telemetry data aggregation service (e.g., in system 22 in FIG. 1) for storage on storage devices 24.

As examples, telemetry data (e.g., current and/or historical telemetry data) may include telemetry data for client devices 14 such as client-to-access-point connection metrics, client device application usage metrics, client device application quality of experience (QoE) metrics and other application QoE related metrics, radio-frequency parameters as observed by client device 14 (e.g., received signal strength indicators (RSSI)), client roaming behavior, client location, and/or general client device information. The telemetry data may include radio data for access points 12 (e.g., for radios 52 therein) such as radio-frequency parameters as observed by radio(s) 52 (FIG. 2), service set identifiers (SSIDs) provided by radio(s) 52, operating channel(s) of radio(s) 52, and/or general radio information (e.g., radio capabilities, radio identifiers, etc.). The telemetry data may include network infrastructure data such as a processor utilization metric (e.g., for processing circuitry 42 (FIG. 2), for packet processors 46 (FIG. 2), for a compute device of server 18, a compute device of server 20, etc.), a memory utilization metric (e.g., for memory circuitry 44 (FIG. 2), for a storage device of server 18, for a storage device of server 20, etc.), reachability information (e.g., whether or not a network component such as network device 10, server 18, or server 20 is reachable, active interfaces on the network component through which the network component is reachable, etc.), and/or other operating metrics for each network infrastructure component of network 8. The telemetry data may include metrics or other information gathered for client-side applications 16 such as latency, connectivity information, performance information, and/or application testing information. The telemetry data may include device configuration information (e.g., parameters configured on each wireless access point 12 or other network device 10), SSID configuration information (e.g., features enabled for each SSID configured on each wireless access point 12), global policy configuration information (e.g., radio-frequency parameter thresholds or other parameters applied across multiple or all of wireless access points 12 in network 8).

These examples of types of telemetry data are merely illustrative. If desired, other suitable types of current and/or historical telemetry data may be obtained and processed by tagging module 30.

Based on the obtained telemetry data, tagging module 30 may associate different network entities (e.g., network 8, network devices 10, processing circuitry of devices, memory circuitry of devices, radios 52, servers 18, servers 20, clients 14, applications 16, etc.) with issue-indicating tags 58 (sometimes referred to herein as tag information). Each tag 58 may identify a corresponding abnormality or potential issues observed or otherwise determined based on the obtained telemetry data. An illustrative tag 58 may identify an applicable scope 60 of the issue, a severity 62 of the issue, the issue 64 itself, and time information 65 at which or during which the one or more affected network entities are tagged with tag 58. If desired, other issue-indicating tags conveying other types of information may be used instead of or in addition to tags 58.

Scope 60 may include information indicative of a scope of network 8 (e.g., a number of network components in network 8) affected by issue 64. As examples, the scope information may be indicative of a system-level or network-wide issue that affects the operation of multiple devices such as multiple client devices 14 or other end hosts of network 8, multiple network devices 10, multiple application servers 18, and/or any other devices (e.g., servers) in network 8, may be indicative of a device-level issue that affects the operation of a single network device, e.g., when a network device 10 is non-operational, when a given application server 18 is down, etc., may be indicative of a client-level issue that affects the operation of a single client device 14, may be indicative of a (device-) component-level issue that affects the operation of a single component within a single network device 10 or within a server (18 or 20), may be indicative of an application-level issue that affects the operation of a single application 16 across one or more (e.g., all) client devices 14, etc.

Severity 62 may include information indicative of a severity of issue 64. In configurations sometimes described herein as an illustrative example, severity information may be used to indicate whether or not an issue 64 is an actual problem that should be reported to a user (e.g., via device 34 in FIG. 1) or whether or not an issue 64 is a warning or informational in nature that does not need to be reported to the user. This type of reporting of issue 64 to the user may include sending a notification (e.g., an alert) to user device 34 and may sometimes be referred to as active reporting as the troubleshooting system actively presents the issue and/or other information (e.g., resulting from the analysis of the issue) to the user without being directly prompted by the user. In some instances, the troubleshooting system may perform passive reporting (with or without active reporting) by storing and/or otherwise preparing issue 64 for presentation to the user when prompted by the user. In one illustrative configuration, troubleshooting system 22 may include or be communicatively coupled to a network management application (e.g., executing on server equipment such as the server equipment on which system 22 is executed). The server-side network management application may be accessible by the user on device 34 using a web application or generally a corresponding client-side application executing on user device 34. The network management application may obtain (e.g., from components of system 22) issue 64 and/or other information associated with issue 64 for presentation on a dashboard or other user interface implemented by the network management application when the user on device 34 accesses the network management application.

As an example, severity 64 may indicate a first severity level for an issue 64 that is a critical problem to be addressed and therefore should be (e.g., must be, unless otherwise configured by a user) reported to the user, a second severity level for an issue 64 that is a warning which, if left unresolved, may result in the occurrence of a critical problem, and/or a third severity level for an issue 64 that is informational when considered in isolation but may be used to indicate a critical problem when considered in combination with other tags 58. Whereas some issues 64 indicated by tags 58 having the first severity level (e.g., indicative of critical problems that may cause network inefficiencies, loss of network connection by end hosts, and/or other significant disruptions to network operations) should be promptly (e.g., actively and passively) reported (e.g., along with the determined cause and recommendation), tags 58 having the second or third severity levels may remain unreported to the user (e.g., may not be actively reported to the user via an unprompted alert to the user device in real-time but may still be passive reported such that the user device can be informed of these types of issues when the user accesses the troubleshooting system and/or the network management application).

Time information 65 may be a timestamp at which tag 58 is generated and/or associated with one or more network entities affected by issue 64, may be a time period during which issue 64 is observed (e.g., based on current and historical telemetry data), may include time information indicative of a lifetime of tag 48 when associated with the one or more entities, and/or may include other time information related the tagging of or the experiencing of issues by the one or more network entities.

Because tags 58 can capture information indicative of issues at various levels of hierarchy (e.g., at a system level, at a device level, at a client level, at a device component level, at an application level, etc.), with varying degrees of severity, at various points in time, and across an entirety of network 8, the various issues 64 that can be identified in tags 58 can be numerous. As just a few examples, a given issue 64 in a corresponding tag 58 may be an application experience issue (e.g., with a given application 16 at a given client device 14, with all applications 16 across network 8, caused by a wired portion of network 8, caused by a wireless portion of network 8, etc.), an infrastructure issue (e.g., that impacts client performance and/or application experience), a client-specific issue (e.g., that impacts application experience), a non-performance issue (e.g., in informational tags 58 having the third severity level) that can be used in combination with other issues to detect root causes, a network coverage issue (e.g., related with wireless coverage provided by wireless access points 12), an issue observed over time (e.g., as a trend over time) based on the use of historical data 26, a network and/or device misconfiguration issue, etc.

In general, tagging module 30 may identify issue 64 and may associate the corresponding tag 58 (containing the identified issue 64) with one or more of the network entities (thereby tagging the one or more network components). If desired, each issue 64 may be identified based on a given metric gathered as part of the telemetry data exceeding a fixed or adjustable threshold, or a range specified by thresholds, and/or may generally be identified based on the information gathered as part of the telemetry data meeting one or more criteria (e.g., including user-configured criteria). If desired, tagging module 30 may use regression or other machine learning algorithms, and/or other configured heuristics to identify issues 64 and consequently tag the network components with corresponding issue-indicating tags 58.

If desired, troubleshooting system 22 may include multiple such tagging modules 30 (FIG. 3) each configured to generate tags 58 for different types of issues 64 and/or at least some of which are configured to generate tags 58 of the same types of issues 64 in parallel.

Figure 4:
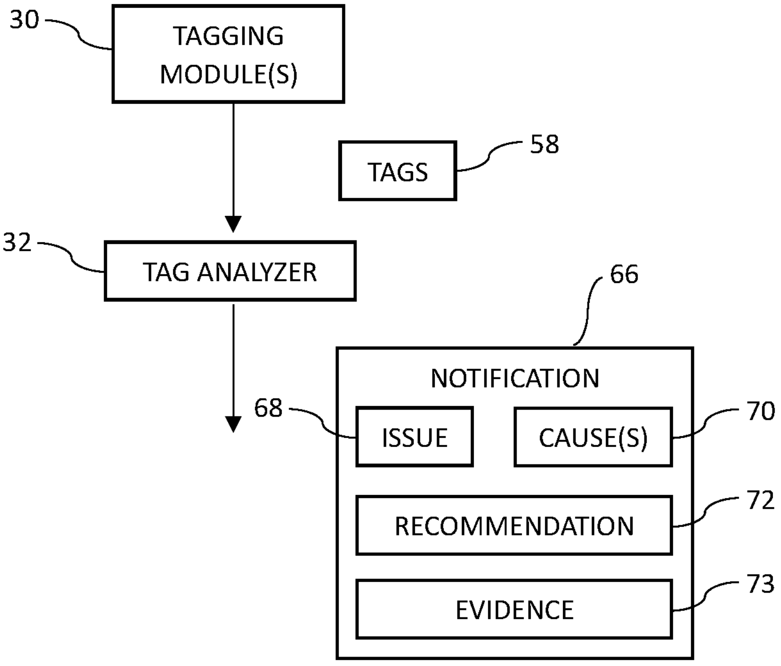
FIG. 4 is a diagram of an illustrative tag analyzer configured to process the tag information for the network entities in accordance with some embodiments.

FIG. 4 is a diagram of an illustrative tag analyzer such as tag analyzer 32 in troubleshooting system 22 (FIG. 1). Tag analyzer 32 may receive or otherwise obtain issue-indicating tags 58 (e.g., generated by one or more tagging modules 30 and/or stored on storage devices 24 that store the tag information generated by tagging modules 30).

Tag analyzer 32 may correlate different tags 58 to one another to determine one or more causes of an issue. As one illustrative example, a first tag 58 may be indicative of a first issue 64 at a first network entity (e.g., tagged or otherwise associated with the first tag 58), while a second tag 58 may be indicative of a second issue 64 at a second network entity (e.g., tagged or otherwise associated with the second tag 58). Because the operations of the first and second network entities are interdependent (e.g., the second network entity handles the network traffic sent from and/or received by the first network entity), tag analyzer 32 may correlate these two tags 58 and determine that a (root) cause of the first issue 64 is the second issue 64.

This example is merely illustrative. In general, tag analyzer 32 may be configured to identify other types of more complex correlations and determine corresponding causes based on the complex correlations. In particular, tag analyzer 32 may determine that an issue 64 of a given tag 58 has multiple (possible) root causes based on multiple other tags 58 each indicating a corresponding issues 64 (e.g., using a correlation between three or more tags), may determine that a root cause not represented by a tag 58 is causing one or more issues 64 in corresponding tag(s) 58 based on contextual information (e.g., provided in one or more informational tags 58 with the third severity level), and/or may generally perform a root cause analysis based on tag(s) 58 in other manners (e.g., based on other pre-configured correlations, relationships, and/or heuristics, based on patterns of correlations, relationships, and/or heuristics learned over a learning period of processing test tags 58 and applied thereafter to perform the root cause analysis using actual tags 58 generated by modules 30, based on statistical and machine learning algorithms to identify the correlations, relationships, and/or heuristics to be used for the root cause analysis, etc.).

Configured in the manner described above, tag analyzer 32 may provide one or more root causes for sets of issues experienced at one or more network entities based on the correlation of tags 58. To facilitate issue mitigation, tag analyzer 32 and/or another recommendation system communicatively coupled to tag analyzer 32 may generate one or more recommendations based on the identified root cause(s) for resolving the issue(s). Tag analyzer 32 may further output a notification such as notification 66 containing issue 68 to be resolved (e.g., some types of issues 64 in FIG. 3 such as those having high severity level(s)), the one or more identified causes 70 of issue 68, one or more recommendations 72 for resolving issue 68, and/or evidence 73 supporting the existence of issue 68 and the cause(s) of issue 68 being cause(s) 70. For example, evidence 73 may include a list of client devices and/or access points experiencing issues impacted by a particular cause, which can illustrate to the user the existence of the issues and the cause of issues being the particular cause.

As one illustrative example, troubleshooting system 22 (FIG. 1) may provide interfaces (e.g., network interfaces coupled to network 8) through which notification 66 may be provided to a user device such as user device 34 (FIG. 1) as user output (e.g., to be displayed via user interface on device 34). In this example, troubleshooting system 22 may be performing active reporting and notification 66 may itself be (or otherwise cause) an alert sent to and presented on device 34. As examples, the user interface for actively presenting these alerts may include user interfaces for chat applications or instant message applications or generally any other types of user interfaces for presenting the user with real-time unprompted alerts (e.g., user interfaces for paging services). In some instances, troubleshooting system 22 may perform active reporting depending on the scope of the issue (e.g., perform active reporting only if affected network scope is greater than a threshold), the time of day or other time information (e.g., perform active reporting only during the day, during working hours, during the weekdays, etc.), and/or other factors. If desired, notification 66 may, instead or additionally, be provided by tag analyzer 32 to a management system (e.g., the network management application forming part of system 22 or communicatively coupled to system 22) configured to perform mitigation of the identified causes based on notification 66 and/or configured to prepare the content of notification 66 for presentation when accessed or otherwise prompted by the user (e.g., in a passive reporting scheme).

In some illustrative configurations described herein as an example, network 8 may include a plurality of client devices 14 wirelessly connected to an access point 12 and, through wireless access point 12, may be connected to a wired portion of network 8. In these illustrative configurations, tagging modules 30 may be configured to provide tags and associate these tags with one or more network entities and tag analyzer 32 may be configured to determine root cause(s) of issues relating to poor client application experience based on the tags, as an example. If desired, tagging modules 30 may also tag network entities with other tags indicative of other issues and tag analyzer 32 may determine root causes of issues relating to other problems.

FIG. 5 is a diagram of an illustrative network configuration in which network 8 includes client devices 14-1, 14-2, and 14-3 wirelessly connected to wireless access point 12. Wireless access point 12 may include one or more radio (e.g., radio(s) 52 in FIG. 2) or generally wireless communication circuitry (e.g., wireless communication circuitry 50 in FIG. 2) to facilitate these wireless connections. Wireless access point 12 may convey network traffic for applications (e.g., application 16 in FIG. 1) executing on each of client devices 14-1, 14-2, and 14-3.

In the example of FIG. 5, troubleshooting system 22 (e.g., tagging module 30) may associate (e.g., tag) client device 14-1 with tags 58-1 and 58-2, may associate (e.g., tag) client device 14-2 with tag 58-2, and may associate (e.g., tag) client device 14-3 with tag 58-1. In particular, tagging module 30 may obtain telemetry data indicative of a first issue experienced by client devices 14-1 and 14-3 and may indicate the first issue by associating client devices 14-1 and 14-3 with tag 58-1. Tagging module 30 may obtain telemetry data indicative of a second issue experienced by client devices 14-1 and 14-2 and may indicate the second issue by associating client devices 14-1 and 14-2 with tag 58-2.

Figure 6:
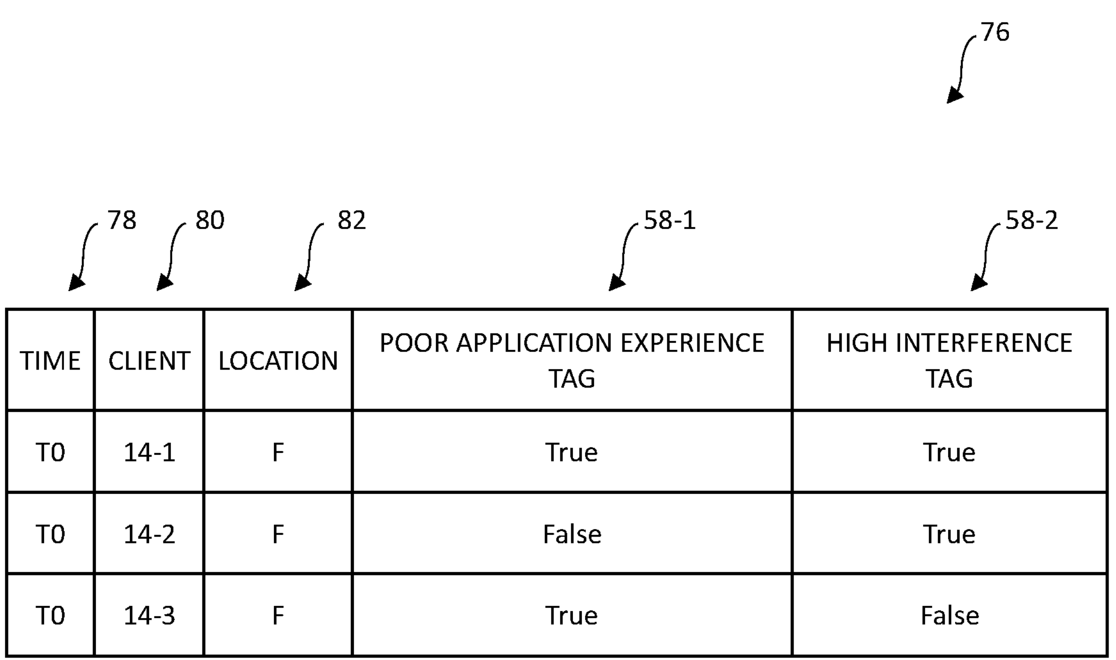
FIG. 6 is a diagram of illustrative tags for a plurality of client devices in accordance with some embodiments.

In illustrative configurations sometimes described herein as an example, tag 58-1 may be indicative of an application experience issue (e.g., with each client device 14 being tagged when a criterion indicative of an application experience issue with a given application 16 is met), while tag 58-2 may be indicative of a high radio-frequency interference issue (e.g., with each client device 14 being tagged when a criterion indicative of a high radio-frequency interference issue is met). FIG. 6 is a diagram of an illustrative table 76 that represents associations between client devices 14-1, 14-2, and 14-3, and tags 58-1 and 58-2, among other client device information. While the association or tag information for client devices 14-1, 14-2, and 14-3 is presented in tabular form in the example of FIG. 6 (e.g., in table 76), this is merely illustrative. If desired, storage devices 24 for troubleshooting system 22 (FIG. 1) may store associations between a client device and its tags or other information in any other suitable manner (e.g., using other suitable data structures).

In general, a tagging module 30 (FIG. 3) may obtain telemetry data (e.g., as described in FIG. 3) to provide the tagging and/or generate the associations indicated in table 76. If desired, tagging module 30 may store these associations (e.g., client-tag associations) in storage device(s) 24 that is accessible to tag analyzer 32. Tag analyzer 32 (FIG. 4) may obtain these associations, may perform analysis on the obtained associations, e.g., to determine a root cause of a network issue, such as a root cause of a poor application experience issue indicated by a client device tagged with tag 58-1, and may provide the corresponding recommendations or take other suitable remediation action(s).

In the example of FIG. 6, tagging module 30 may identify each client (device) 14 (e.g., by a corresponding device identifier such as a Media Access Control address, a numerical identifier, or other identifier) in column 80. Each of client devices 14-1, 14-2, and 14-3 and their associations may be identified in a corresponding row of table 76 (except the header row of table 76).

In particular, tagging module 30 may tag or otherwise associate client device 14-1 with a tag 58-1 (e.g., shown by a "True" value) indicative of poor application experience (e.g., as issue 64 of tag 58-1 as illustrated in FIG. 3) based on obtaining application metric(s) (e.g., obtained as telemetry data for an application 16 executing on client device 14-1) exceeding corresponding poor application experience threshold(s) or otherwise meeting one or more corresponding poor application experience criteria. Tag 58-1 may indicate an (application-specific) issue with a particular application based on metrics obtained based on the particular application. If desired (e.g., in other examples), tag 58-1 may indicate an issue common across a set of (e.g., all) applications executing on client device 14-1.

Tagging module 30 may also tag or otherwise associate client device 14-1 with a tag 58-2 (e.g., shown by a "True" value) indicative of high radio-frequency (e.g., non-Wi-Fi) interference (e.g., as issue 64 of tag 58-2 as illustrated in FIG. 3) based on obtaining radio-frequency metric(s) (e.g., obtained as telemetry data for client device 14-1) exceeding corresponding high radio-frequency interference threshold(s) or otherwise meeting one or more corresponding high radio-frequency interference criteria. This may be caused by transmissions by interference source 74 (FIG. 5) detected by and/or for client device 14-1.

Tagging module 30 may associate client device 14-1 with location information 82 such as a location F (e.g., indicative of one of multiple floors of a building). In other instances, when other network entities are associated with location information, the associated location may be indicative of one of multiple sites or campuses across which a network spans, indicative of a particular building at a site, a particular floor of a particular building, a particular room, etc.). If desired, location information 82 may similarly be provided in a tag format (e.g., as an informational tag 58 having a low level of severity 62).

Tagging module 30 may also associate client 14-1 with time information 78. In particular, time information 78 may provide a timestamp or time period TO when client device 14-1 is tagged or otherwise associated with location F, tag 58-1, and tag 58-2. As described in connection with FIG. 3, time information such as time information 78 may be stored as part of tag 58-1 and/or 58-2 tagging client device 14-1

(e.g., as part of time information 65 for these tags as illustrated in the example of FIG. 3).

Tag analyzer 32 may obtain the tags or other associations of client device 14-1 shown by the corresponding row in table 76. Based on the obtained associations, tag analyzer 32 may determine that the issue of high radio-frequency interference (indicated by tag 58-2) is causing or at least contributing to the poor application experience (indicated by tag 58-1) at client device 14-1 based on an analyzer pre-configured (or analyzer-learned) correlation between tags 58-1 and 58-2. In other words, based on a client device being tagged with both tags 58-1 and 58-2, analyzer 32 may determine that the issue of tag 58-2 causes and is therefore a (possible) root cause of the issue of tag 58-1. Consequently, tag analyzer 32 may provide a recommendation for the cause of the network issue. In this illustrative example, tag analyzer 32 may determine that a high radio-frequency interference being experienced by client device 14-1 is associated with the presence of an interference source (e.g., interference source 74 in FIG. 5) proximal to client device 14-1. Accordingly, tag analyzer 32 may provide, as an example, a type, location, and/or other information identifying or otherwise indicating the interference source. This recommendation information, along with the cause (e.g., high interference) and the issue (e.g., poor application experience) may be provided to a user as a notification (e.g., notification 66 in FIG. 4) by tag analyzer 32 and/or other components implemented by processing circuitry of troubleshooting system 22 (FIG. 1).

For client device 14-2, tagging module 30 may tag or otherwise associate client device 14-2 with tag 58-2 (e.g., shown by a "True" value) indicative of high radio-frequency interference based on obtaining radio-frequency metric(s) (e.g., obtained as telemetry data for client device 14-2) exceeding corresponding high radio-frequency interference threshold(s) or otherwise meeting one or more corresponding high radio-frequency interference criteria. This may be caused by transmissions by interference source 74 (FIG. 5) detected by and/or for client device 14-2.

Tagging module 30 may also associate client device 14-2 with location information 82 (e.g., the same location F or another location). If desired, location information 82 may similarly be provided in a tag format and the corresponding location tag may be associated with client device 14-2. Tagging module 30 may also associate client 14-2 with time information 78 (e.g., the same timestamp or time period TO or another timestamp or time period). As described in connection with FIG. 3, time information 78 may be stored as part of tag 58-2 tagging client device 14-2 (e.g., as part of time information 65 for tag 58-2 as illustrated in the example of FIG. 3).

Tag analyzer 32 may obtain the tags or other associations of client device 14-2 shown by the corresponding row in table 76. Based on the obtained associations, tag analyzer 32 may determine that there are no issues with application experience at client device 14-2. This determination may be based on tag analyzer 32 identifying that client device 14-2 is not tagged or otherwise associated with tag 58-1 (e.g., shown by a "False" value) indicative of poor application experience (which, if tagged, has a severity 62 that indicates an actual problem warranting a notification to a user as described above in example of client device 14-1). In particular, tagging module 30 may disassociate client device 14-2 from tag 58-1 based on obtaining application metric(s) (e.g., obtained as telemetry data for an application 16 executing on client device 14-2) not exceeding corresponding poor application experience threshold(s) or otherwise not meeting one or more corresponding poor application experience criteria. This determination of no issue may also be based on tag 58-2 (tagging client device 14-2) having a severity 62 that serves as a warning or is informational in nature (e.g., is used in combination with other tags to indicate actual problems warranting user notification as described in connection with FIG. 3). Accordingly, tag analyzer 32 may not send a notification to a user (e.g., device 34 in FIG. 1) based on determining that there are no issues with application experience at client device 14-2 (e.g., with respect to the same application 16 executing on both client devices 14-1 and 14-2).

For client device 14-3, tagging module 30 may also tag or otherwise associate client device 14-3 with tag 58-1 (e.g., shown by a "True" value) indicative of poor application experience based on obtaining application metric(s) (e.g., obtained as telemetry data for an application 16 executing on client device 14-3) exceeding corresponding poor application experience threshold(s) or otherwise meeting one or more corresponding poor application experience criteria.

Tagging module 30 may also associate client device 14-3 with location information 82 (e.g., the same location F or another location). If desired, location information 82 may similarly be provided in a tag format and the corresponding location tag may be associated with client device 14-3. Tagging module 30 may also associate client 14-3 with time information 78 (e.g., the same timestamp or time period TO or another timestamp or time period). As described in connection with FIG. 3, time information 78 may be stored as part of tag 58-1 tagging client device 14-3 (e.g., as part of time information 65 for tag 58-1 as illustrated in the example of FIG. 3).

Tag analyzer 32 may obtain the tags or other associations of client device 14-3 shown by the corresponding row in table 76. Based on the obtained associations, tag analyzer 32 may determine that, while there is poor application experience at client device 14-3, the cause has not been determined by tag analyzer and remains unknown. This determination may be based on tag analyzer 32 identifying that client device 14-3 is not tagged or otherwise associated with tag 58-2 (e.g., shown by a "False" value) indicative of high interference (which, if tagged, indicates high interference is the cause of poor application experience as described above in example of client device 14-1). In particular, tagging module 30 may disassociate client device 14-3 from tag 58-2 based on obtaining radio-frequency metric(s) (e.g., obtained as telemetry data for or experienced by client device 14-3) not exceeding corresponding high interference threshold(s) or otherwise not meeting one or more corresponding high interference criteria.

Accordingly, tag analyzer 32 may make additional determination(s) using other tags associated with other tagged network entities (e.g., access point 12, an edge switch, a network server 20, etc.) to further determine the cause of the poor application experience at client device 14-3. In some instances, the determination of no known cause may be based on no other correlations being established (e.g., pre-configured or learned by tag analyzer 32) between tag 58-1 (tagging client device 14-3) and other tags 58 tagging client device 14-3 or other network entities.

If desired, tag analyzer 32 and/or other components implemented by processing circuitry of troubleshooting system 22 (FIG. 1) may provide a notification (e.g., notification 66 in FIG. 4) with the issue (e.g., poor application experience) with an unknown cause and/or other information (e.g., actions to be taken for further troubleshooting).

In the example of FIG. 6, tagging module 30 provides a set of tags for corresponding network entities (e.g., client devices 14-1, 14-2, and 14-3) that are usable at a given time (e.g., time T0) by tag analyzer for analysis. However, this example is merely illustrative. In general, tagging module(s) 30 may associate tags 58 with and/or disassociate tags 58 from corresponding network entities dynamically over time. Based on the persistence of some tags 58, the removal of some tags 58, and/or other more complex tagging and untagging patterns over time, a tagging module 30 may further generate time-dependent tags 58 are indicative of corresponding trend-based or time-dependent issues 64 (e.g., periodic issues 64). In particular, tag analyzer 32 may use time-dependent issues 64 to further pinpoint cause(s).

Figure 7:
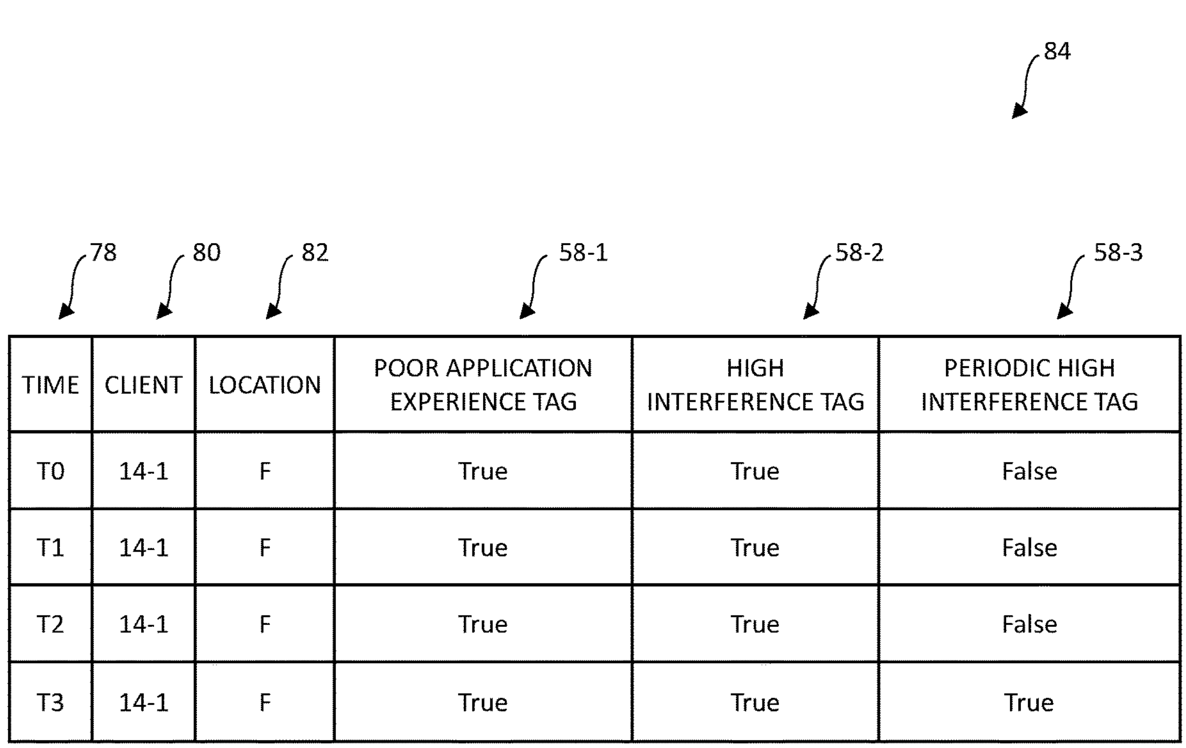
FIG. 7 is a diagram of an illustrative tag containing temporal information in accordance with some embodiments.

FIG. 7 shows an illustrative example of a time-dependent tag. In particular, the example of FIG. 7 provides additional temporal information on the tagging of client device 14-1 (e.g., as described in connection with FIG. 6 which only shows the tag state of client device 14-1 at a given time TO).

As shown in FIG. 7, tagging module 30 may tag or otherwise associate an additional time-dependent tag 58-3 (e.g., a tag 58 indicative of an issue that is exhibited periodically) based on when one or more (time-dependent or trend-indicating) criteria are met. In particular, as similarly described in connection with FIG. 6, at each of times T0, T1, T2, and T3, tagging module 30 may associate tags 58-1 and 58-2 with client device 14-1 (e.g., based on telemetry data for client device 14-1 meeting corresponding criteria at each of times T0, T1, T2, and T3). Tagging module 30 may continually associate tags 58-1 and 58-2 with client device 14-1 across a time period encompassing T0, T1, T2, and T3 (e.g., by keeping devices 14-1 tagged while updating time information in the tags while the corresponding tagging criteria are still met) or may periodically re-associate tags 58-1 and 58-2 with client device 14-1 at times T0, T1, T2, and T3 (e.g., client device 14-1 may not necessarily be tagged with tags 58-1 and/or 58-2 during intervening time periods).

Tagging module 30 may determine, based on telemetry data or more specifically based on a tagging pattern of tag 58-2, whether or not to tag or otherwise associate client device 14-1 with a time-dependent tag such as tag 58-3 indicative of periodic high interference (e.g., as issue 64 of tag 58-1 as illustrated in FIG. 3). In an illustrative configuration described herein as an example, tagging module 30 may not tag client device 14-3 with tag 58-3 at times T0, T1, and T2 (e.g., using the "False" value in table 76) based on the tagging pattern of tag 58-2 over time (and/or radio-frequency metrics based on telemetric data for client device 14-3) not meeting one or more periodic high interference criteria. In other words, tagging module 30 may not have tagged client device 14-1 with periodic high interference tag 58-3 because a trend has not been established based on the telemetry data to confirm periodicity of high interference.

At time T3, tagging module 30 may determine that the high interference (e.g., indicated by tag 58-2) is periodic and tag or otherwise associate client device 14-1 with periodic high interference tag 58-3 (e.g., shown by a "True" value) based one or more criteria being met. As examples, this determination may be based on a criterion that is met when client device 14-1 is tagged with high interference tag 58-2 at four (or any other number) instances in time (e.g., times T0, T1, T2, and T3), a criterion that is met when the instances in time at which client device 14-1 is tagged with tag 58-2 is indicative of a periodicity or other temporal pattern (e.g., the instances are at the same time of day, the instances are at the same day of the week, the instances are on weekdays but not weekends, etc.), and/or based on other criteria that are met when a trend over time is established.

As described in connection with client 14-1 in FIG. 6, tag analyzer 32 may be configured to provide a notification containing the recommendation, the cause, and the issue based on the associations to client device 14-1 at time TO (even without being tagged with tag 58-3). Additionally (or as an alternative to the operations described in connection with FIG. 6 performed by tag analyzer 32 for client device 14-1 at time T0), tag analyzer 32 may, based on the tag state of client device 14-1 at time T3, correlate both the high interference tag indicated by tag 58-2 and the periodic high interference tag indicated by tag 58-3 to provide more detailed cause to the poor application experience indicated by tag 58-1. As an example, tag analyzer 32 may provide more detailed cause and/or recommendation as part of its output notification in addition to the information described in connection with client 14-1 in FIG. 6. As an example, the cause may indicate that the interference is caused by a periodic transmitter of interference and the recommendation may indicate one or more possible sources that follow the periodic behavior causing the periodic interference such that the user can more readily identify and remove the source of interference (e.g., interference source 74 in FIG. 5).

The types of tagging by tagging module 30 and the types of operations (e.g., correlations and notifications) performed by tag analyzer 32 described in connection with FIGS. 6 and 7 are merely illustrative. In general, tagging module(s) 30 may be configured to associate numerous types of tags with any suitable number of network entities of different types and tag analyzer 32 may be configured to correlate various sets of tags and/or other information to determine causes of network issues (e.g., an application experience issue experienced by a client device for a particular application, a client device issue, a wireless access point issue, a network device issue, a server issue, etc.).

FIG. 8 is a diagram of additional illustrative tags associated with network entities by tagging module 30 and processed (e.g., correlated) by tag analyzer 32 to determine causes of different network issues. In particular, tags shown in each row of table 86 in FIG. 8 may be associated with different network entities by tagging module 30, but these tags in a given row and for the different network entities may be correlated with each other to determine a root cause of a network issue by tag analyzer 32. The example of FIG. 8 is described in connection with a network (e.g., network 8 in FIG. 1) that includes a plurality of client devices 14 (e.g., client devices 14-4, 14-5, 14-6, 14-7, 14-8, 14-9, and 14-10), that includes one or more wireless access points 12 wirelessly coupled to client devices 14 and having radios (e.g., that operate in a 2.4 GHz frequency band, a 5 GHz frequency band, and/or in other frequency bands), that includes an edge switch having a port coupled to the one or more access points 12 via wired connections, and that includes server equipment for server(s) 18 that implement server-side applications for client-side applications 16 executed on client devices 14. Illustrative scenarios are described in connection with various client devices identified (e.g., by a corresponding client device identifier) in column 80.

In one illustrative scenario described in connection with the first row of table 86 (excluding the header row), tagging module 30 may tag or otherwise associate client device 14-4 with a 2.4 GHz operating frequency band as frequency band information 88 (e.g., as information in a tag 58 with low severity) indicative of a frequency band used to connect to a wireless access point 12 (e.g., sent by client device 14-4 and/or access point 12 as telemetry data to troubleshooting system 22), with a tag 58-4 indicative of a low received signal strength indicator (RSSI) issue (e.g., based on signals received by client device 14-4 in the operating frequency band and sent as telemetry data to system 22), and with a tag 58-1 indicative of a poor application experience issue for one or more applications 16 executing on client device 14-4 (e.g., based on application performance metrics sent as telemetry data to system 22). In some instances, tagging module 30 may tag a given application 16 with tag 58-1 instead of or in addition to tagging one or more client devices running the application 16. Tagging module 30 may also tag or otherwise associate the connected wireless access point 12 with a tag 58-5 indicative of poor wireless coverage (e.g., based on telemetry data obtained by neighboring access points of the connected wireless access point 12 and sent as telemetry data to system 22).

In this illustrative scenario in connection with client device 14-4, tag analyzer 32 may determine, based on correlating low RSSI tag 58-4 and poor coverage tag 58-5 with poor application experience tag 58-1, that a coverage hole in wireless network (indicated by tags 58-4 and 58-5) is causing the poor application experience issue (indicated by tag 58-1) experienced by one or more applications 16 executing on client device 14-4.

In one illustrative scenario described in connection with the second row of table 86 (excluding the header row), tagging module 30 may associate client device 14-5 with the 2.4 GHz operating frequency band as information 88, and with tags 58-4 and 58-1. Tagging module 30 may associate the wireless access point 12 connected to client device 14-5 with tag 58-5. Additionally, tagging module 30 may also associate client device 14-5 with a tag 58-6 indicative of a client device (e.g., device 14-5) being configured to operate only in a 2.4 GHz frequency band as its wireless (e.g., Wi-Fi) connection (e.g., based on telemetry data sent from the connected access point 12 and/or for client device 14-5 to system 22).

Client device 14-5 may be tagged in a similar manner as client device 14-4, except with the addition of tag 58-6. Accordingly, in this illustrative scenario in connection with client device 14-5, tag analyzer 32 may further determine, based on the additional only 2.4 GHZ-capable tag 58-6 for client device 14-5 (in addition to the same type of correlation established between poor application experience tag 58-1, poor coverage tag 58-5, and low RSSI tag 58-4 as described for client device 14-4), that the coverage hole in wireless network is specific to the 2.4 GHz radio-frequency band on which client device 14-5 operates (e.g., must operate to connect to wireless access point 12).

In one illustrative scenario described in connection with the third row of table 86 (excluding the header row), tagging module 30 may associate client device 14-6 with the 2.4 GHz operating frequency band as information 88, and with tags 58-4 and 58-1. Tagging module 30 may associate the wireless access point 12 connected to client device 14-6 with tag 58-5. Additionally, tagging module 30 may further associate a (5 GHz frequency band) radio 52 (FIG. 2) of the connected wireless access point 12 with a tag 58-7 indicative of a maximum number (or a greater-than-threshold number) of client devices 14 being connected to the radio 52 (e.g., based on telemetry data obtained from the connected access point 12 and/or for the radio 52).

In this illustrative scenario in connection with client device 14-6, tag analyzer 32 may determine, based on correlating maximum client tag 58-7, poor coverage 58-5, and low RSSI tag 58-4 to poor application experience tag 58-1, that client device 14-6 failed to connect to the preferred 5 GHz SSID (because the maximum number of client devices 14 are already connected to the 5 GHz radio as indicated by tag 58-7) and that client device 14-6 connected to a suboptimal 2.4 GHz SSID, thereby causing the poor application experience issue (indicated by tag 58-1) experienced by one or more applications 16 executing on client device 14-6.

In one illustrative scenario described in connection with the fourth row of table 86 (excluding the header row), tagging module 30 may tag or otherwise associate client device 14-7 with a 5 GHz operating frequency band as information 88, with a tag 58-9 indicative of a low client (uplink) data rate for client device 14-7 (e.g., based data rate metrics gathered by the connected wireless access point device 12 and/or for client device 14-7 and sent as telemetry data to system 22), and with a tag 58-1 indicative of a poor application experience issue for one or more applications 16 executing on client device 14-7 (e.g., based on application performance metrics sent as telemetry data to system 22). Tagging module 30 may also tag or otherwise associate a radio 52 (FIG. 2) of the connected wireless access point 12 with a tag 58-8 indicative of high radio uplink traffic (e.g., based on telemetry data gathered for the connected wireless access point 12 and/or by connected client devices 14 and sent as telemetry data to system 22).

In this illustrative scenario in connection with client device 14-7, tag analyzer 32 may determine, based on correlating radio high uplink traffic tag 58-8 and low client data rate tag 58-9 with poor application experience tag 58-1, that there is high contention for uplink traffic (e.g., by other connected client devices 14) for the same radio 52 to which client device 14-7 is connected, thereby causing the poor application experience issue (indicated by tag 58-1) experienced by one or more applications 16 executing on client device 14-7.

In one illustrative scenario described in connection with the fifth row of table 86 (excluding the header row), tagging module 30 may tag or otherwise associate client device 14-8 with a 5 GHz operating frequency band as information 88 and with tag 58-1 indicative of a poor application experience issue for one or more applications 16 executing on client device 14-8 (e.g., based on application performance metrics sent as telemetry data to system 22). Tagging module 30 may also tag or otherwise associate the wireless access point 12 connected to client device 14-8 with a tag 58-10 indicative of high access point utilization (e.g., based on telemetry data gathered for the connected wireless access point 12 and sent as telemetry data to system 22). As examples, tag 58-10 may be indicative of high access point processor utilization and may be associated with (e.g., tagged to) processing circuitry 42 of the access point 12 (instead of the access point 12 itself), may be indicative of high access point memory utilization and may (instead) be associated with (e.g., tagged to) memory circuitry 44 of the access point 12, and/or may be indicative of high utilization of other components of the access point 12 and may (instead) be associated with (e.g., tagged to) the other components of the access point 12.

In this illustrative scenario in connection with client device 14-8, tag analyzer 32 may determine, based on correlating high access point (memory and/or processor) utilization tag 58-10 with poor application experience tag 58-1, that abnormally high access point (memory and/or processor) utilization at the connected access point 12 is causing the poor application experience issue (indicated by tag 58-1) experienced by one or more applications 16 executing on client device 14-8.

In one illustrative scenario described in connection with the sixth row of table 86 (excluding the header row), tagging module 30 may tag or otherwise associate client device 14-9 with a 5 GHz operating frequency band as information 88 and with tag 58-1 indicative of a poor application experience issue for one or more applications 16 executing on client device 14-9 (e.g., based on application performance metrics sent as telemetry data to system 22). Tagging module 30 may also tag or otherwise associate a network switch (e.g., a device 10 in FIGS. 1 and 2 coupled to client device 14-9 via a wireless access point 12) with a tag 58-11 indicative of a high packet drop rate at the network switch (e.g., based on telemetry data gathered for the network switch and sent as telemetry data to system 22). If desired, one or more (faulty or high load) components of the network switch (e.g., causing the high packet drop rate) may be tagged with tag 58-11 instead of the network switch itself.

In this illustrative scenario in connection with client device 14-9, tag analyzer 32 may determine, based on correlating high packet drop rate tag 58-11 with poor application experience tag 58-1, that packet losses at the network switch (indicated by tag 58-11) are causing the poor application experience issue (indicated by tag 58-1) experienced by one or more applications 16 executing on client device 14-9.

In one illustrative scenario described in connection with the seventh row of table 86 (excluding the header row), tagging module 30 may tag or otherwise associate client device 14-10 with a 5 GHz operating frequency band as information 88 and with tag 58-1 indicative of a poor application experience issue for one or more applications 16 executing on client device 14-10 (e.g., based on application performance metrics sent as telemetry data to system 22). Tagging module 30 may also tag or otherwise associate server equipment (e.g., for server 18 or 20 in FIG. 1) and/or the virtual machine implemented thereon with a tag 58-12 indicative of a high virtual machine (processor and/or memory) utilization at the server equipment (e.g., based on telemetry data gathered for the server equipment and sent as telemetry data to system 22). If desired, one or more hardware components of the server equipment (e.g., compute and/or storage devices implementing the virtual machine) may be tagged with tag 58-12 instead of the entire server equipment and/or the virtual machine itself.

In this illustrative scenario in connection with client device 14-10, tag analyzer 32 may determine, based on correlating high server (virtual machine processor and/or memory) utilization tag 58-12 with poor application experience tag 58-1, that abnormally high virtual machine (processor and/or memory) utilization at the server equipment is causing the poor application experience issue (indicated by tag 58-1) experienced by one or more applications 16 executing on client device 14-10.

The types of tags illustrated in FIGS. 6-8 are merely illustrative. Any suitable number and/or types of tags may be correlated with one another or with other tags to identify network issues and determine the root causes of the network issues. As another illustrative example, tags may be generated based on current network configuration information (e.g., SSID configuration information such as a setting or feature for a SSID) and may be associated with corresponding access points and/or more specifically the radios or SSIDs on these access points. The tag analyzer may identify an issue (e.g., an application experience issue) based on the setting being on or off at a given time (e.g., a SSID that has the setting turned on and is tagged as such may be correlated with connected client devices tagged as experiencing issues). If desired, these types of configuration-based or setting-based tags may themselves be time-dependent and historical telemetry data (e.g., indicating the states of these configurations or the on and off states of the settings) may be used to generate these time-dependent tags.

Configurations in which root cause(s) of poor client application experience are determined by tag analyzer 32 based on tags 58 are sometimes described herein as illustrative examples. If desired, root causes of other network issues experienced by other network components may similarly be determined by tag analyzer 32 based on tags 58 associated with various network entities by tagging module 30.

Figure 9:
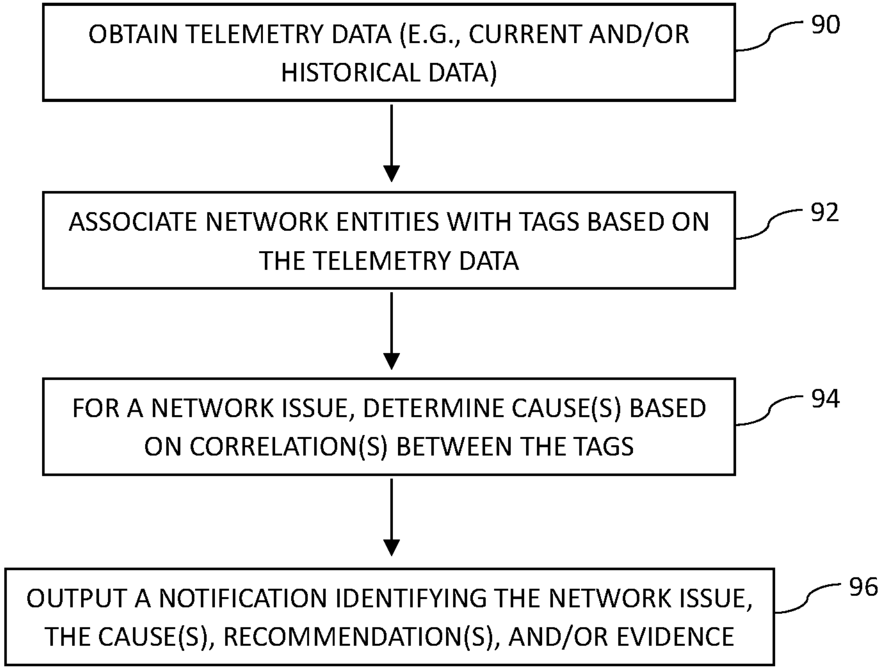
FIG. 9 is a flowchart of illustrative operations for network-wide troubleshooting based on tag information in accordance with some embodiments.

FIG. 9 is a flowchart of illustrative operations performed by a troubleshooting system to determine causes for network issues. In particular, these operations may be performed by processing circuitry (e.g., compute devices 28 in FIG. 1) for server equipment or other computing equipment for implementing troubleshooting system 22 (FIG. 1). In illustrative configurations described herein as an example, the operations described in connection with FIG. 9 may be performed by the processing circuitry executing software instructions stored on memory circuitry (e.g., storage devices 24) for server equipment or other computing equipment for implementing troubleshooting system 22. If desired, one or more operations described in connection with FIG. 9 may be performed by other components for system 22 or generally in network 8 (FIG. 1).

At block 90, processing circuitry for a troubleshooting system (e.g., implementing a tagging module and/or a telemetry data streaming interface) may obtain telemetry information from a network for which troubleshooting operations are performed. As an example, the operations described in connection with FIGS. 3 and 6-8 may be performed by the processing circuitry to obtain the telemetry information, which can include current (real-time) telemetry information and/or stored (historical) telemetry information.

At block 92, the processing circuitry (e.g., implementing the tagging module) may associate network entities in the network with tags based on the telemetry data (e.g., based on the telemetry data meeting certain tagging criteria). As an example, the operations described in connection with FIGS. 3 and 6-8 may be performed by the processing circuitry to perform the associations (e.g., tagging operations).

At block 94, the processing circuitry (e.g., implementing a tag analyzer) may, for a network issue (e.g., a client application experience issue), determine one or more causes based on certain correlations between the tags. As an example, the operations described in connection with FIGS. 4 and 6-8 may be performed by the processing circuitry to perform the tag correlation and/or cause determination operations.

At block 96, the processing circuitry (e.g., implementing the tag analyzer and/or a user notification interface) may output a notification identifying the network issue, the one or more causes, recommendations (e.g., indications of remediation actions based on the determined causes), and/or evidence of the network issue and/or the one or more causes. As an example, the operations described in connection with FIGS. 1, 4, and 6-8 may be performed by the processing circuitry to perform the notification operations.

The methods and operations described above in connection with FIGS. 1-9 may be performed by the components of a server and/or other host equipment for a troubleshooting system using software, firmware, and/or hardware (e.g., dedicated circuitry or hardware). Software code for performing these operations may be stored on non-transitory computer-readable storage media (e.g., tangible computer-readable storage media) stored on one or more of the components of the server and/or other host equipment. The software code may sometimes be referred to as software, data, instructions, program instructions, or code. The non-transitory computer-readable storage media may include drives, non-volatile memory such as non-volatile random-access memory (NVRAM), removable flash drives or other removable media, other types of random-access memory, etc. Software stored on the non-transitory computer readable-storage media may be executed by processing circuitry on one or more of the components of the server and/or other host equipment (e.g., compute devices 28 of system 22 in FIG. 1).

The foregoing is merely illustrative and various modifications can be made to the described embodiments. The foregoing embodiments may be implemented individually or in any combination.

What is claimed is:

1. A troubleshooting system comprising:

a storage device;

a tagging module coupled to the storage device and configured to obtain telemetry data for a network and to tag network entities in the network with a plurality of issue-indicating tags based on the telemetry data, the network entities including a first network entity of a first entity type and a second network entity of a second entity type different from the first entity type, wherein the first network entity is tagged with a first set of issue-indicating tags, of the plurality of issue-indicating tags, specific to the first entity type, and wherein the second network entity is tagged with a second set of issue-indicating tags, of the plurality of issue-indicating tags, specific to the second entity type; and a tag analyzer coupled to the tagging module and configured to determine a cause of a network issue experienced on the network based on a correlation between the first set of issue-indicating tags specific to the first entity type and the second set of issue-indicating tags specific to the second entity type and to output the determined cause.

2. The troubleshooting system defined in claim 1, wherein the plurality of issue-indicating tags comprise tags each identifying an issue and a scope of the network affected by the issue.

3. The troubleshooting system defined in claim 2, wherein the tags each identify a timestamp associated with the issue.

4. The troubleshooting system defined in claim 3, wherein the tags each identify a severity of the issue.

5. The troubleshooting system defined in claim 1, wherein the first network entity is a first device in the network, wherein the second network entity is a second device in the network, wherein a first tag in the plurality first set of issue-indicating tags is associated with the first device in the network, and wherein a second tag in the second set of issue-indicating tags is associated with the second device in the network.

6. The troubleshooting system defined in claim 5, wherein the first device is one of a client device, a wireless access point, a network switch, an application server, or a network server and wherein the second device is another one of the client device, the wireless access point, the network switch, the application server, or the network server.

7. The troubleshooting system defined in claim 1, wherein the first network entity is a first device in the network, wherein the second network entity is a second device in the network, wherein a first tag in the plurality first set of issue-indicating tags is associated with a component of the first device in the network, and wherein a second tag in the second set of issue-indicating tags is associated with the second device in the network.

8. The troubleshooting system defined in claim 7, wherein the component of the first device is a processor of the first device, a memory of the first device, a radio of the first device, or an application executing on the first device.

9. The troubleshooting system defined in claim 1, wherein the first network entity is a client device of the network, wherein the network issue comprises a client application experience issue indicated by a given tag in the first set of issue-indicating tags, and wherein the tagging module is configured to tag an application executing on the client device of the network with the given tag based on the telemetry data.

10. The troubleshooting system defined in claim 9, wherein the second set of issue-indicating tags comprises an additional tag associated with a wireless access point, a network switch, or a server and wherein the tag analyzer is configured to correlate at least the additional tag with the given tag to determine a cause of the client application experience issue indicated by the given tag.

11. The troubleshooting system defined in claim 10, wherein the determined cause of the client application experience issue comprises an issue indicated by the additional tag associated with the client device, the wireless access point, the network switch, or the server.

12. The troubleshooting system defined in claim 1, wherein the second set of issue-indicating tags comprises a time-dependent tag indicative of a trend over time.

13. The troubleshooting system defined in claim 12, wherein the first network entity is a client device of the network, wherein the network issue comprises a client application experience issue indicated by a given tag in the first set of issue-indicating tags, wherein the tagging module is configured to tag an application executing on the client device of the network with the given tag based on the telemetry data, and wherein the tag analyzer is configured to correlate at least the time-dependent tag with the given tag to determine that a cause of the client application experience issue comprises a periodic issue indicated by the time-dependent tag.

14. A method of performing troubleshooting for a network, the method comprising:

associating a given network entity with a first tag indicative of a first issue experienced by the given network entity at a given time;

associating the given network entity with a second tag indicative of a second issue experienced by the given network entity at the given time;

disassociating the given network entity from a third tag indicative of a periodic issue at the given time;

based on the given network entity being associated with the second tag at the given time and being disassociated with the second tag at one or more additional times, associating the given network entity with the third tag indicative of the periodic issue being experienced by the given network entity;

determining a cause of the first issue based on the first and third tags; and outputting a notification identifying the cause of the first issue.

15. The method defined in claim 14, wherein the given network entity is a client device of the network.

16. The method defined in claim 15, wherein associating the given network entity with the first tag is based on telemetry data for the given network entity meeting at least a first criterion and wherein associating the given network entity with the second tag is based on the telemetry data for the given network entity meeting a second criterion.

17. The method defined in claim 14, wherein the first tag includes the first issue, the given time, a first scope of the network affected by the first issue, and a first level of severity of the first issue and wherein the second tag includes the second issue, the given time, a second scope of the network affected by the second issue, and a second level of severity of the second issue.

18. The method defined in claim 14, wherein outputting the notification comprises sending the notification as an alert to a user device or sending the notification to server equipment executing a network management application for user presentation.

19. The method defined in claim 14, wherein determining the cause of the first issue comprises correlating the third tag and the second tag with the first tag and wherein the second tag and at the third tag indicate the cause of the first issue.

20. One or more non-transitory computer-readable storage media comprising computer-executable instructions that, when executed by one or more processors, cause the one or more processors to:

obtain telemetry data for at least some network entities in a network;

determine whether to associate a first issue-indicating tag with each of the network entities in the network based on whether the telemetry data for each of the network entities satisfies a first criterion, wherein the first criterion is satisfied based on a metric in the telemetry data for a given one of the network entities exceeding a corresponding threshold for the metric;

determine whether to associate a second issue-indicating tag with each of the network entities in the network based on whether the telemetry data for each of the network entities satisfying satisfies a second criterion;

determine a cause of a network issue experienced on the network based on a correlation between at least the first and second issue-indicating tags; and take a remediation action based on the determined cause.

* * * * *